July 20, 1965

J. R. McCOY 3,195,644

VALVE SYSTEM FOR SEQUENTIAL FLOW FROM MULTIZONE PRODUCING WELLS

Filed June 5, 1962

JAMES ROY McCOY
INVENTOR.

BY D. Case Richard

July 20, 1965  J. R. McCOY  3,195,644
VALVE SYSTEM FOR SEQUENTIAL FLOW FROM MULTIZONE PRODUCING WELLS
Filed June 5, 1962  3 Sheets-Sheet 2

JAMES ROY McCOY
INVENTOR.

BY D. Carl Richards

FIG. 6
FIG. 7
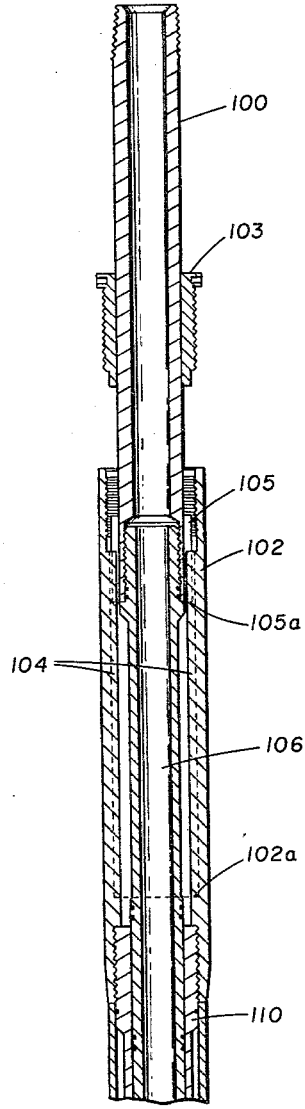
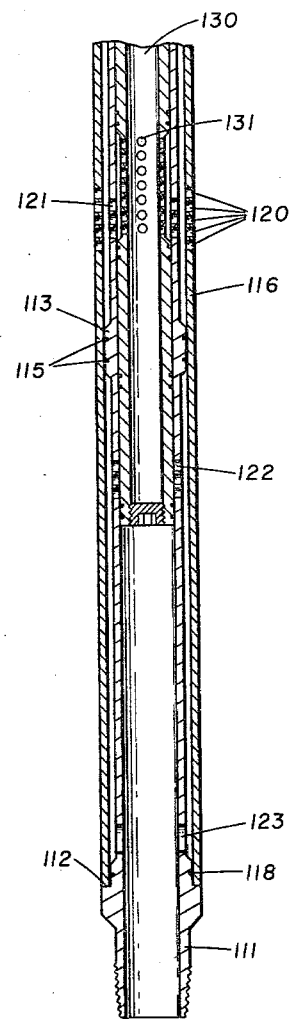
JAMES ROY McCOY
INVENTOR.
BY D. Carl Richards 3,195,644
VALVE SYSTEM FOR SEQUENTIAL FLOW FROM MULTIZONE PRODUCING WELLS
James Roy McCoy, Lubbock, Tex., assignor to Harvest Queen Mill & Elevator Company, Dallas, Tex., a corporation of Texas
Filed June 5, 1962, Ser. No. 200,128
8 Claims. (Cl. 166—147)

This invention relates to a valve system for controlling the fluid flow from a plurality of producing horizons and more particularly to a tubing-operated valve unit adaptable to be positioned with reference to an anchored housing at any one of a plurality of flow positions for flow from separate horizons.

In many producing oil wells, two or three zones of producing potential are encountered. Multiple strings of tubing are often installed in such wells and suitably connected so that flow in each string is limited to a particular horizon. Maintaining separate the production from different horizons necessitates expensive installations. In instances where the allowable production can be produced from a given zone in less than one-half of an allocated producing period, multiple installations often become economically unfeasible and a less complex installation can be employed for completing the desired production through time sharing of a single installation.

The allowable production from a given zone in general is fixed by governmental regulation. In many areas allowables are so apportioned that a monthly allowable can be produced in periods of the order of eight days. With such production rates and limits, it is possible to produce from one zone during one period of the month and from another zone during another period through the same producing string of tubing, thereby avoiding the more complicated installation widely employed on multiple completion wells.

In one embodiment, a multizone downhole valve was employed sequentially to produce fluids from a first producing formation below a packer in a well and from a second producing formation above the packer. An elongated inner cylinder was secured in fixed relation to the packer with a flow channel extending from the packer into the cylinder. An outer cylinder encased the inner cylinder, providing an annular chamber therebetween.

It is an object of this invention to provide a well installation which will provide for separate flow from any one of several zones through a single string of tubing. Production is delivered serially through the tubing to the surface from several different zones. A further object of the invention is to provide a unit which will permit pumping operations sequentially from two different zones through a single downhole installation while accommodating variations in load on the pumping units.

It is a further object of the invention to provide a tubular system of relatively simple construction for providing flow channels from any one of three producing zones into a single string of tubing.

An inner cylinder is provided with a set of upper perforations and a set of lower perforations with a baffle in the annular chamber located between the sets of perforations. Tubing, terminated in a perforated element and operable within the inner cylinder, is slidable for registration of the perforations therein with each of the upper set and lower set in the inner cylinder. A perforation is provided through the inner cylinder into the annulus above the packer for flow of fluids from the first producing formation. Perforations are provided in the outer cylinder above the sealing means for flow of fluid from the second producing formation.

For a more complete understanding of the present invention and for further objects and advantages thereof, reference may now be had to the following description taken in conjunction with the accompanying drawings in which:

FIGURES 6 and 7 illustrate in detailed sectional views a two zone producing system.

*Three zone system*

Figure 1:
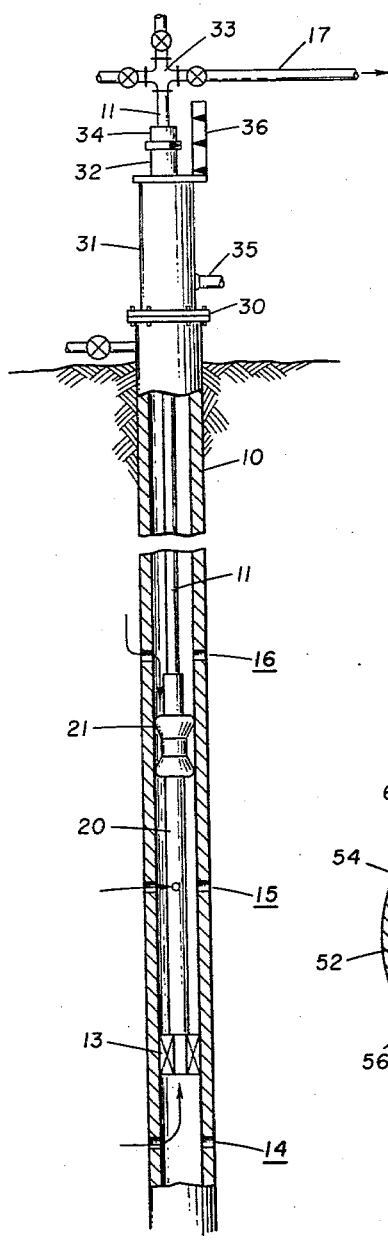
FIGURE 1 is a schematic illustration of the well installation in accordance with the present invention.

Referring now to FIGURE 1, there is illustrated a well installation in which a casing 10 is set in a borehole through which there also extends a production string of tubing 11. A packer 13, such as a conventional hook wall packer, is set in the casing between perforations 14 and 15 leading respectively from a lower producing zone and an intermediate producing zone. A third set of perforations 16 are located above the perforations 15 for control of flow from an upper producing zone. Fluids may thus enter the casing 10 from any one or all of the perforations 14, 15 and 16.

In accordance with the present invention, provision is made for channeling the production from the perforations 14, 15 and 16 through the tubing 11 sequentially to the earth's surface for flow by way of a line 17 to suitable storage or handling facilities. A valve unit 20 is mounted in the tubing string and is coupled at its lower end to the packer 13. At an intermediate point thereon, there is provided a packer unit 21 which is an integral part of the valve 20. The packer 21 is located above the perforations 15. The valve 20, as hereinafter explained, is particularly suited to select flow from any one of three producing zones.

At the earth's surface the casing 10 supports a jack cylinder 31 on its upper flange 30. A jack piston 32 is provided through which the tubing 11 extends. The tubing 11 is terminated at its upper end in a suitable control valve unit 33. A collar 34 is secured to the tubing 33 and is seated on the upper end of cylinder 32. A line 35 is provided leading to the jack cylinder 32 for actuation of the same through hydraulic pressures. By this means the tubing 11 may be raised or lowered over a distance sufficient to actuate the valve 20 for selective production from any one of the perforations 14, 15 or 16. A suitable scale 36 is provided to provide a measure of the precise setting of the valve unit. Alternatively, the jack system and surface connection may be as shown in Patent No. 2,403,987.

Figure 2:
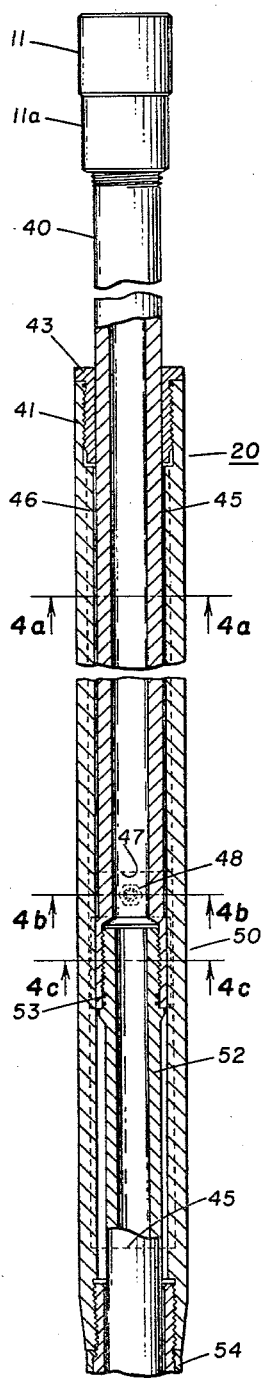
FIGURES 2 and 3 are detailed sectional views of the downhole valve system of FIGURE 1 for producing from three zones.
Figure 3:
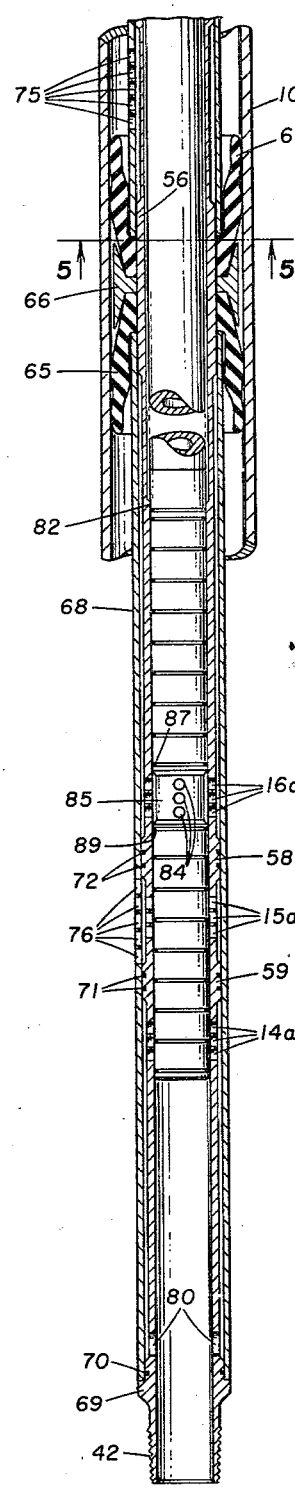

In FIGURES 2 and 3 the valve unit 20 is shown in sectional view. The upper end of the valve unit 20 is connected to the tubing 11. A valve tube 40 extends downwardly from the coupling 11a into an internally ribbed, upper housing cylinder 41. The valve tube 40 is movable over a limited traverse or stroke within the cylinder 41. The lower end of the valve 20 is terminated in a threaded male unit 42 which is to be secured in the well packer, such as the packer 13, FIGURE 1. Thus, it will be understood that the housing of valve 20 is positionally fixed in the well with reference to the casing 10, shown in fragmentary form only in FIGURE 3.

Figure 4A:
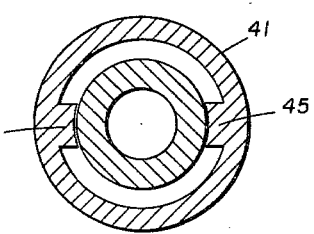
FIGURE 4a is an enlarged sectional view taken along the line 4a—4a of FIGURE 2.
Figure 4B:
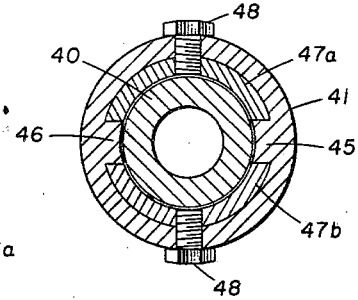
FIGURE 4b is an enlarged sectional view taken along the line 4b—4b of FIGURE 2.
Figure 4C:
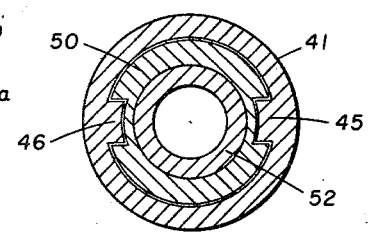
FIGURE 4c is an enlarged sectional view taken along the line 4c—4c of FIGURE 2.

A bushing 43 is threadedly secured in the upper end of the cylinder 41. The cylinder 41 has an inner bore into which there is secured, as by welding, a pair of longitudinal guide strips or ribs 45 and 46, best seen in FIGURE 4a. Approximately midway the length of the cylinder 41 two half-cylinders 47a and 47b are secured internally of the upper cylinder 41 by shear bolts 48. The two half-cylinders 47a and 47b provide a lifting collar mounted at a fixed position within the upper cylinder 41. The valve tube 40 passes through a bushing 43 into the upper cylinder 41 and through the split lifting collar. A collar or upset portion 50, formed on the lower end of the valve tube 40, is provided with slotted guideways in the periphery, as shown in FIGURE 4c, thereof which mate with the ribs 45 and 46.

A hollow valve stem or piston 52 which is closed at the lower end and is of diameter smaller than the valve tube 40, is threaded into the upset portion 50. The piston 52 extends from the upper cylinder 41 through the lower section of the valve 20.

The lower section includes a plurality of separate cylindrical members. The upper cylinder 41 is internally threaded and mates with the upper end of an inner valve cylinder 54. The lower end of the valve cylinder 54 includes the threaded section 42 above described. The inner valve cylinder 54 is smooth walled and preferably is chrome plated to provide a resistant surface against which the valve stem and sealing means carried thereby can work.

The inner valve cylinder 54 includes a plurality of upper perforations 16a, a plurality of intermediate perforations 15a, and a plurality of lower perforations 14a. The inner cylinder 54 has a plurality of longitudinally disposed, upstanding ribs 56 on the exterior surface thereof between the upper end thereof and the upper ports 16a. The inner cylinder 54 also has an upper circular rib section 58 and a lower circular rib section 59. The inner valve cylinder 54 is encompassed by a case including a short sleeve 60 threaded onto the upper section of the cylinder 54 and locked in position thereon by the member 40. The packer 21 is formed by a pair of conically-shaped rubber packers 64 and 65 which are also fitted over the inner cylinder 54. A collar cup 66 is positioned between the confronting ends of the packers 64 and 65. The upper element 64 is cupped upwardly. The lower element of 65 is cupped downwardly. An elongated lower cylinder 68 completes the case, being mounted as to encase the lower end of the inner cylinder 54. The lower end of the outer cylinder 68 rests upon lower shoulder 69 formed on the exterior surface of the inner cylinder 54.

Figure 5:
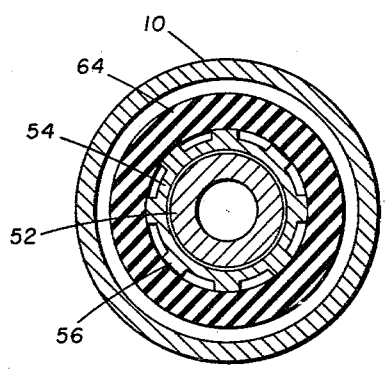
FIGURE 5 is a sectional view taken along the line 5—5 of FIGURE 3.

Sealing means, in the form of O-rings 70, 71 and 72, serve to provide a fluid-tight seal at the bottom of the outer cylinder and at the circular ribs 58 and 59, respectively. Three annular spaces are thus provided between the outer walls of the cylinder 54 and the inner wall of the outer cylinder 68. They are separated by the rib sections 58 and 59 which form sealing baffles. The splined zone 56, best seen in FIGURE 5, provides for continuation through the packer 21 of the annular passage from the short upper sleeve 60 to the lower sleeve 68.

The upper sleeve 60 is provided with exterior perforations 75. Thus, fluid flowing into the casing 10 from above the packer 64 can enter the perforation 75 and travel downwardly through the annulus and through the splined sections to the ports 16a. The outer cylinder 68 is provided with perforations 76 between the packers so that fluid flowing into the casing 10 from below the upper packer 21 and from above the packer 13, FIGURE 1, may enter the annular space between the inner cylinder 54 and cylinder 68. The lower end of the inner cylinder 54 is provided with perforation 80 so that fluid flowing into the casing 10 from below the packer 13 may flow up through the packer 13, through the coupling section 42 and thence through the perforations 80 into the annulus between the cylinder 68 and the valve cylinder 54.

It will be noted that the outside diameter of the piston 52 is less than the inside diameter of the upper section of valve cylinder 54. At a shoulder 82 the inner diameter of the inner valve cylinder 54 is reduced so that it substantially corresponds with the outer diameter of the piston 52. Preferably, the section from shoulder 82 to the bottom port 80 is treated to provide a wear-resistant surface. Similarly, the outer surface of the valve stem is treated to provide for resistance to wear.

Intermediate the length of the lower half of the piston 52 there is provided a plurality of ports 84. The ports 84 lead through a wall section 85 of the piston of reduced diameter. The reduced section 85 is shown located as to be in registration with the upper port 16a in the inner valve cylinder 54.

The piston 52 is provided with a plurality of exterior annular grooves spaced both above and below the ports 84. Each of the grooves carries therein a piston ring which is resiliently biased into engagement with the inner wall of the cylinder 54. More particularly, immediately above the ports 84 there is provided a groove in which a piston ring 87 is mounted. Immediately below the ports 84 is a similar groove in which a piston ring 89 is mounted. In the embodiment illustrated, nine piston rings are mounted on the valve stem below the ports 84 and ten piston rings are mounted thereon above the ports 84.

When the piston 52 is positioned as illustrated in FIGURES 2 and 3, the ports 84 are in registration with port 16a so that fluid entering the annulus by way of port 75 flows downwardly through the annulus and into the section 85 by way of port 16a and from there into the valve stem by way of ports 84. Fluid thus produced from the upper producing zone, entering by way of ports 16, FIGURE 1, will be channeled into the inside of the tubing 11 for flow to the surface.

In this position, it will be noted that the grooved upset collar 50 has the upper surface thereof in engagement with the lower surface of the split lifting collar 47. Thus, by raising the tube 11 until resistance is encountered upon engagement with the split lifting collar, the ports 84 will be in registration with the upper ports 16a.

With a knowledge of the spacing between the upper ports 16a and the intermediate ports 15a, the tubing 11 may be lowered by use of the jack systems 31–32, FIGURE 1, so that the ports 84 are in registration with ports 15a. In this position, fluid entering the casing by way of ports 15, FIGURE 1, may enter the outer cylinder 68 by way of ports 76, the inner cylinder 54 by way of ports 15a, and thence into the valve stem 52 by way of ports 84.

In order to produce from the lower zone, the tubing may then be lowered until the slotted upset portion 50 at the upper end of the valve stem 52 engages shoulder 45 near the lower end of the upper section 41. When in this position, fluid flows upward through the casing 10 through ports 80 and thence through the annulus. The fluid may then enter the inner cylinder by way of ports 14a and then may enter the valve stem 52 by way of ports 84.

Thus a structure is provided which permits fail-safe operation for three zone production. The O-rings 70, 71, 72 and the seal at the upper end of the inner cylinder 54 maintain separation of fluids from each of the three producing zones. The piston rings, such as rings 87 and 89 working in the valve cylinder below the point 82, prevent flow between the ports 14a, 15a and 16a. The only flow possible is then into the valve stem 52 by way of ports 84.

In the event the tool is to be removed from the well, it will be desirable to unload the tubing 11 of the fluids therein. The packer 21, including rubber cups 64 and 65, normally would prevent downward flow with the valve piston in its upper position and thus would prevent unloading the tubing. Therefore, removal of the tool from the borehole is facilitated by shearing the pins 48.

More particularly, when it is desired to remove the tool from the hole, the valve stem may be lifted with sufficient force to shear the pins 48, whereupon the split lifting collars 47a and 47b will travel upwardly until they engage the lower downfacing shoulders of the top bushing 43. When in this position, the valve stem 52 is elevated such that the piston rings and the lower section of the piston are positioned well above the small diameter portion of the cylinder 54 and are located in a section of enlarged diameter so that there will be an annulus between the valve piston and the inner wall of the cylinder 54. Furthermore, there is available the full length of the upper cylinder 41 through which the tubing 11 may be spudded to jar loose the system including packers 13 and 64, 65, 66.

In practice, the tool will be initially set in the well as indicated in FIGURE 1. The tubing 11 will then be set at a first position relative to the valve body as shown in FIGURES 2 and 3 so that for a given period of time during each month the upper zone will be produced. For a second period, the tubing will be lowered so that the intermediate zone will be produced for a predetermined period. Thereafter, the tubing will be lowered so that the lower zone will be produced.

The entire valve system is supported by the tubing for insertion into the well. The valve can be secured to the packer 13 in the conventional method with the upper packer 21 being carried by the valve 20 to maintain a seal between the body of valve 20 and the casing wall.

Two zone system

Referring now to FIGURES 6 and 7, there is illustrated an embodiment of the invention in which production from two zones is to be facilitated. The structure is similar in many respects to the system of FIGURES 1–3. However, there is eliminated the structure forming the upper packer 21 and the third flow path.

In this embodiment there is provided a valve tube 100 which extends down into the upper end of the tool housing which includes an upper cylinder 102. A bushing 103 is adapted to threadedly engage the upper end of the upper cylinder 102. The upper cylinder 102 has a relatively large inner diameter with a pair of longitudinally extending inner ribs 104. The lower end of the valve tube 100 is provided with an upset section 105 which is slotted longitudinally to register with the ribs 104. Valve stem 106 threadedly engages the upset section 105. The upper cylinder 102 is internally threaded to receive the upper end of an inner valve cylinder 110. The lower end 111 of the inner valve cylinder 110 is threaded as to engage a packer such as packer 13 of FIGURE 1. Immediately above the threaded section 114 there is provided an upfacing shoulder 112 above which the inner cylinder 110 is of substantially reduced external diameter. The inner cylinder 110 is provided with a circular rib section 113 approximately midway the length thereof. In the surface of the rib section 113 there are provided a pair of grooves in which O-rings 115 are located.

An outer cylinder 116 is telescoped over the inner cylinder 110. O-rings 118 and intermediate O-rings 115 serve to provide a seal between the outer wall of the inner cylinder 110 and the inner wall of the outer cylinder 116. The upper end of the outer cylinder 116 is mounted in abutting relation with the lower end of the upper cylinder 102.

The outer cylinder 116 is provided with a series of perforations 120 located at a point above the annular rib 113. The inner cylinder 110 is provided with upper perforations 121 which are positioned facing the perforations 120. A set of lower perforations 122 are provided in the inner cylinder 110 below the annular rib 113. Lower perforations 123 are also provided immediately above the O-ring 118.

The valve stem 106 has an intermediate section 130 of reduced diameter which is characterized by including a plurality of ports, such as port 131, which extend into the central flow channel therein. Piston rings are mounted in a plurality of grooves above and below the intermediate section 130 so that a fluid-tight relationship is maintained between the piston 106 and the cylinder 110.

It will be noted that the reduced diameter section 130 of this embodiment is substantially longer than that of FIGURES 2 and 3. This is for the reason that in a two zone system it is possible to apply the present tool to a pumping well where the allowable may be produced from two zones, by pumping operations, within a given month. However, since the pump will periodically vary the effective load on the tubing as a sucker rod moves up and down to actuate a pump, there may be positional variations in the location of the reduced diameter section 130. Except for the elongated section 130, the travel of the piston 106, merely in response to pumping operations, may be such as to cause misalignment between the perforations 131 in the piston and the perforations 121 in the cylinder wall which would result in malfunction. For this purpose, an elongated perforated section has been provided so that the piston 106 may undergo some travel during pumping operations without misregistration between the piston and cylinder perforations.

The valve tube 100 is to be connected to tubing such as the tubing 11 of FIGURE 1. When positioned as shown in FIGURES 6 and 7, well fluids inside the casing may enter the tubing by way of ports 120, 121, and 131.

When the piston is lowered to the point that the lower shoulder 105a of the upset portion 105 rests on the upfacing shoulder 102a of the upper cylinder 102, the perforated sections 130 of the piston will then be located in registration with the lower ports 122. In this position, fluid may flow upward through the lower tubing, through the packer 13, through section 11, through ports 123, in the annulus between cylinders 110 and 116, into the cylinder 110 by way of ports 122, and thence through ports 131 into the piston channel.

Thus a two zone tool is provided which may be operated either on flowing wells or on pumping wells for producing sequentially the allowable production from a pair of zones. If the tool is to be removed from the borehole the positioning of the piston in its uppermost position will permit the tubing to be unloaded through the perforations 130, 121 and 120.

It will be noted that the shear pin 48, the split cylinder 47a and 47b and other provisions for facilitating an elongated spudding stroke have not been included in the system of FIGURES 6 and 7. It is to be understood however, that, if desired, such elements may be incorporated in a two zone tool wherein an upper cylinder may be employed which is relatively longer than that specifically disclosed in FIGURES 6 and 7. Further, in each of the embodiments herein discussed, the valve housing is connected directly into the packer 13. It is to be noted that the packer may be located considerably below the valve unit, as by the inclusion of one or more joints of tubing. For the purpose of the description, the producing zones have been identified as the zones at which the casing is perforated. Where the middle producing formation is perforated over a substantial vertical section, it will be necessary to include tubing between the packers 13 and 21 of length sufficient to span all such perforations.

Figure 8:
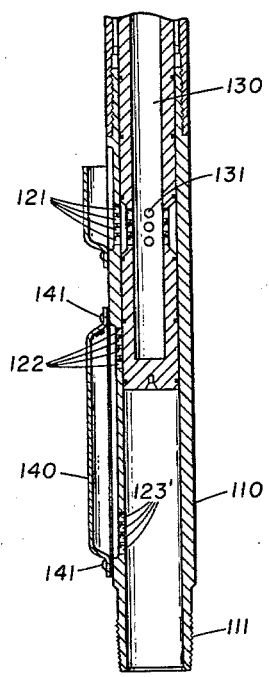
FIGURE 8 illustrates a modification of the system of FIGURES 6 and 7.

Having described the three zone tool and a two zone tool it will now be apparent that modifications may be made in the systems disclosed in FIGURES 1–7. For example, as illustrated in FIGURE 8, a single tubing may be employed in a two zone tool while incorporating the advantages of the present invention therein. Only the lower end of a single-tube tool has been shown in FIGURE 8. Where consistent, parts in FIGURE 7 also appearing in FIGURE 8 are given the same reference character. The tube 110 is terminated at its lower end in the threaded section 111 for permitting the same to be secured to tubing or to a packer. The piston 130 is provided with the ports 131 which are shown in position adjacent to upper port 121 in the exterior wall of the tubing 130. In this position, fluids flowing into a casing from above a packer may enter the piston 130 by way of ports 121 and 131.

If the piston is lowered so that the ports 131 are adjacent to the lower ports 122, then the fluids may flow into the piston 130 from the lower producing formation below the packer. The flow path for such fluids is completed by means of a cap 140 which is secured as by rivets or screws 141 onto the outer surface of the cylinder 110. Fluids may flow from inside the cylinder 110 through the lower ports 123′, thence upward through the zone beneath the cap 140 and into the cylinder 110 by way of ports 122. In the embodiment constructed in accordance with FIGURE 8, the lower end of the cylinder 110 was milled flat as to be square. Caps, such as cap 140, were placed over the flat sections to assure a fluid-tight seal which would prevent the escape of fluids from under the rim of the cap 140.

While in FIGURE 8 the ports 131 are shown as occupying but limited length of the piston, it is to be understood that an elongated ports section such as shown in FIGURE 7 may be employed.

In the systems of FIGURES 1–5, as well as in the two zone system of FIGURES 6 and 7, a pair of cylinders are employed to provide the annular flow paths which permit the control of fluid flow. The sealing elements, such as O-rings 115, FIGURE 7, are employed to maintain separation between upper zone and lower zone production. It is recognized that different forms of packing may be employed to maintain this separation. Furthermore, it will be possible to form the annular ribs, such as rib 113, FIGURE 7, on the inner wall of the outer cylinder 116. In such case the outer wall of the inner cylinder would be of continuous cylindrical form. Interchange of parts in symmetrical systems such as above exemplified may thus be accomplished in other portions of the system without departing from the spirit of the invention.

In each of the embodiments of the system disclosed herein, the piston is so provided as to operate within a working cylinder with the seal between the piston and cylinder walls being completed through the use of piston rings. In accordance with the preferred embodiment of the invention, the piston rings were spring steel rings which were urged into contact with the cylinder wall in manner well-known in the art. However, in some instances where conditions of extreme wear are encountered, it may be necessary to resort to the more conventional chevron-type packings to maintain the desired seal around the piston. Chevron packings are well-known in the art and are widely used in downhole as well as surface operations where a movable member operates through a packing gland on one side of which is a high pressure zone and the other side is a low pressure zone. In accordance with the present invention, where a working member such as the piston is concerned, means are provided for maintaining a continuous and positive seal as to prevent intermingling of fluids produced from two different zones while permitting the movement of the piston to select production from one of the several zones. In each case there is provided an inner cylinder which is adapted to be secured in fixed relation to a packer in a well bore with at least three sets of perforations in the cylinder. One set of perforations is adjacent the lower end thereof and the other two sets are at an elevated level thereabove. A flow channel is provided linking the lower set of perforations and the lowermost of the upper two sets exteriorly of the cylinder. A hollow piston is provided in each of the devices which is actuated from the mouth of the well and movable while in sealed relation within the cylinder and has a set of perforations leading thereinto.

By this means the piston may be moved into registration with the perforations in the cylinder for selectively controlling the flow paths from formations to the surface. In a preferred embodiment of the invention, the valve system involves a pair of concentric cylinders supported in fixed relation one to the other with a plurality of annular flow paths therebetween.

Having described the invention in connection with certain specific embodiments thereof, it is to be understood that further modifications may now suggest themselves to those skilled in the art and it is intended to cover such modifications as fall within the scope of the appended claims.

What is claimed is:

1. A downhole valve for control of flow from a first producing zone above a packer in a well and a second producing zone below said packer, which comprises:
    (a) a tubular cylinder adapted to be secured in fixed relation to said packer with first localized perforations in the wall thereof above said packer, second localized perforations spaced above said first perforations and third localized perforations spaced above said second perforations,
    (b) a hollow piston closed at the bottom having a side wall aperture therein, said piston being movable for selective registration of said aperture with either of said second and third perforations,
    (c) packing means between the confronting walls of said cylinder and said piston for preventing fluid flow longitudinally therebetween, and
    (d) means for forming an enclosed flow channel exteriorly of said cylinder between said first perforations and said second perforations.

2. A multizone downhole valve for control of flow from a first producing zone above a packer in a well and from a second producing zone below said packer which comprises:
    (a) a tubular cylinder, adapted to be secured in fixed relation to said packer, with at least three sets of perforations, one set being adjacent the lower end thereof and the other two sets being at different elevated levels,
    (b) means for forming an enclosed flow channel exterior of said cylinder between said one set and the lowermost of the other two sets of said perforations,
    (c) a hollow piston closed at the bottom having a sidewall aperture therein movable for selective registration of said aperture with either of said two sets of perforations, and
    (d) sealing means mounted in the walls of one of said cylinder and said piston for preventing flow longitudinally between the confronting walls of said cylinder and piston.

3. A multizone downhole valve for control of flow from a first producing zone above a packer in a well and from a second producing zone below said packer which comprises:
    (a) an inner tubular cylinder, adapted to be secured in fixed relation to said packer, with at least three sets of perforations, one set being adjacent the lower end thereof and the other two sets being at different elevated levels,
    (b) an outer cylinder encasing said inner cylinder for providing an annular chamber therebetween with a sealing baffle in said annular chamber between said other two sets of perforations,
    (c) a hollow piston closed at the bottom having a sidewall aperture therein and adapted to be actuated from the mouth of said well for registering said aperture successively with each set of said two sets of perforations, and
    (d) a plurality of sealing means between said inner cylinder and said piston for preventing flow longitudinally of said valve between said inner cylinder and said piston.

4. A downhole valve for control of flow from a first producing zone above a packer in a well and a second producing zone below said packer, which comprises:
(a) an inner tubular cylinder, adapted to be secured in fixed relation to said packer, with first localized perforations in the wall thereof immediately above said packer, second localized perforations spaced above said first perforations and third localized perforations spaced above said second perforations,
(b) a hollow piston closed at the bottom having a sidewall aperture therein and movable for registration of said aperture with said second and third perforations,
(c) packing means between the confronting walls of said inner cylinder and said piston for preventing fluid flow longitudinally therebetween,
(d) an outer cylinder for forming a flow channel exteriorly of said cylinder between said first perforations and said second perforations, and
(e) stop means for limiting movement of said piston and said aperture to a traverse within said inner cylinder for lifting said valve from said well.

5. A downhole valve for control of flow from first and second producing zones above a packer in a well and from a third producing zone below said packer which comprises:
(a) an inner tubular cylinder, adapted to be secured in fixed relation with said packer, with first localized perforations immediately above said packer, second localized perforations above said first perforations, third localized perforations above said second perforations, and fourth localized perforations above said third perforations,
(b) a cylindrical case encompassing said cylinder and including packing structure for engaging the wall of said well at a point above said packer,
(c) sealing means between the confronting walls of said inner cylinder and said cylindrical case at axially spaced zones, one of which is between said second and third perforations and the other of which is between said third and fourth perforations thereby to form a plurality of annular chambers exteriorly of said inner cylinder, said case having localized perforations therein above said point and localized perforations below said point between said sealing means,
(d) a hollow piston closed at the bottom having a sidewall aperture therein movable for selective registration of said aperture with either of said second, third and fourth perforations, and
(e) sealing means between the walls of said inner cylinder and said piston for preventing fluid flow longitudinally therealong.

6. The combination set forth in claim 5 in which:
(a) an upper chamber is secured to said inner cylinder and through which said piston extends,
(b) a cylindrical stop means is mounted inside said upper chamber and encompasses said piston, and
(c) means carried by said piston engages said stop means to limit upward movement of said piston in said inner cylinder.

7. The combination set forth in claim 5 in which:
(a) an upper chamber is secured to said inner cylinder and through which said piston extends,
(b) longitudinal ribs are positioned in said upper chamber,
(c) split cylindrical stop means mounted inside said upper chamber encompass said piston, and
(d) grooved structure on said piston receives said ribs and engages said stop means to limit upward movement of said piston in said inner cylinder.

8. The combination set forth in claim 6 in which:
(a) said cylindrical stop means is secured at a location intermediate the length of said upper chamber by shearable means, and
(b) bushing encompasses said piston and is rigidly secured at an upper zone of said upper chamber.

References Cited by the Examiner
UNITED STATES PATENTS

| | | | |
|---|---|---|---|
| 2,720,926 | 10/55 | Brown | 166—226 |
| 3,024,846 | 3/62 | Gage | 166—226 |
| 3,051,245 | 8/62 | Andrew et al. | 166—226 |
| 3,065,796 | 11/62 | Nutter | 166—226 |

CHARLES E. O'CONNELL, *Primary Examiner*.